US006151000A

United States Patent [19]

Ohtaka et al.

[11] Patent Number: 6,151,000

[45] Date of Patent: Nov. 21, 2000

[54] DISPLAY APPARATUS AND DISPLAY METHOD THEREOF

[75] Inventors: Hiroshi Ohtaka; Masaji Ishigaki; Yasuji Noguchi; Yuichiro Kimura; Ken Kumakura, all of Yokohama, Japan

[73] Assignee: Hitachi, Ltd., Tokyo, Japan

[21] Appl. No.: 08/854,640

[22] Filed: May 12, 1997

[30] Foreign Application Priority Data

May 13, 1996 [JP] Japan .................................... 8-117691

[51] Int. Cl.[7] .............................. G09G 3/28; H04N 5/04; H04N 9/44

[52] U.S. Cl. ................................ 345/63; 345/68; 348/511

[58] Field of Search .................................... 345/3, 60, 63, 345/68, 90, 132, 147–148, 155, 428; 340/717, 771, 784; 358/148, 511

[56] References Cited

U.S. PATENT DOCUMENTS

| | | | |
|---|---|---|---|
| 4,891,705 | 1/1990 | Suzuki et al. | 358/148 |
| 4,965,563 | 10/1990 | Mano et al. | 340/784 |
| 4,990,904 | 2/1991 | Zenda | 340/771 |
| 5,111,190 | 5/1992 | Zenda | 340/717 |
| 5,317,334 | 5/1994 | Sano | 345/148 |
| 5,396,258 | 3/1995 | Zenda | 345/3 |
| 5,448,260 | 9/1995 | Zenda et al. | 345/100 |
| 5,592,187 | 1/1997 | Zenda | 345/3 |
| 5,844,534 | 12/1998 | Okumura et al. | 345/90 |
| 5,856,823 | 1/1999 | Kimoto et al. | 45/153 |

FOREIGN PATENT DOCUMENTS

| | | |
|---|---|---|
| 0295690 | 12/1988 | European Pat. Off. . |
| 0295691 | 12/1988 | European Pat. Off. . |
| 0488326 | 6/1992 | European Pat. Off. . |
| 94/09473 | 4/1994 | WIPO . |

OTHER PUBLICATIONS

SID94DIGEST ( pp. 723–726). by T. Tamura, et al.
SID96DIGEST(pp. 291–294). by T. Yamaguchi, et al.
Communications Institute Technical Report, EID 92–86 issued in Jan., 1993.

*Primary Examiner*—Jeffery Brier
*Assistant Examiner*—Jeff Piziali
*Attorney, Agent, or Firm*—Antonelli, Terry, Stout & Kraus, LLP

[57] ABSTRACT

A display apparatus and display method are provided for a display panel having pixels arranged in a matrix form for displaying an image on a effective display area. Horizontal electrodes and vertical electrodes in the display panel are scanned for selectively illuminating said pixels by using a time sharing drive method in which one field period is divided into plural sub-fields weighted according to a sustaining period. As a result, an effective display area is divided into plural areas, no scanning for selecting a light emitting pixel is executed in a non-display area, and the number of sub-fields is increased in an area in which display in multiple gradations is required in a display area to obtain sufficient gradation. Instead of increasing the number of the sub-fields, the total sustaining period per one field is increased to obtain sufficient brightness. According to a feature of the invention, another area is provided in which the number of sub-fields is limited to the required minimum in which display in multiple gradations is not required. According to other feature of the invention, another area having few sub-fields is prepared instead of providing the non-display area.

8 Claims, 14 Drawing Sheets

DISPLAY APPARATUS AND DISPLAY METHOD THEREOF

BACKGROUND OF THE INVENTION

The invention relates to a display apparatus and display method thereof. A display apparatus, such as a liquid crystal display (LCD), a plasma display panel (PDP), and a digital micromirror display (DMD), is controlled to display luminance gradations (gray level) by a time-sharing drive method for displaying an image by selectively illuminating pixels arranged in a matrix-form.

A prior art example of a plasma display apparatus will be described using the example of a matrix display device. A plasma display device is roughly classified into AC and DC types.

FIG. 1 is a block diagram illustrating the outline of a DC-type plasma display device. A plasma display device 10 is constituted by a display panel 11, a plurality of address electrodes 15, a plurality of scanning electrodes 16, an address pulse generator 12 for driving the address electrodes 15, a scanning and sustaining pulse generator 13 for driving the scanning electrodes 16, and a signal processing circuit 14 for controlling the generators 12, 13. The display panel 11 is provided with two spaced glass plates, the address electrodes 15, the scanning electrodes 16, and a partition for partitioning the space between the two glass plates. A pixel is constituted by a discharge cell which has space partitioned by a partition between the two glass plates. For example, a rare gas, such as He—Xe (helium-xenon) and Ne—Xe (neon-xenon), is enclosed in each discharge cell and when a voltage is applied to a selected address electrode 15 and a selected scanning electrode 16, a discharge occurs and ultraviolet rays are generated. A color display can be produced by coating every discharge cell with a red phosphor, a green phosphor and a blue phosphor and by selecting a phosphor or phosphors according to an image signal.

FIG. 2 illustrates the drive waveform of a DC-type plasma display. In FIG. 2, numeral 30 denotes the drive waveform of the DC type plasma display. The electrodes 15 and 16 are driven in a line sequential manner. An address pulse 31 having a voltage of VA is supplied depending on a picture signal, to an address electrode 15 which corresponds to the discharge cell in the Nth row. In the meantime, a scanning pulse 32 having a voltage of VS is supplied to the scanning electrode 16 in order from the first line. The address voltage VA and the scanning voltage VS are simultaneously supplied to a cell. When a voltage between the electrodes 15 and 16 exceeds the discharge starting voltage, the cell is discharged. This discharge is an address discharge. In a fixed period after discharge, the discharge is sustained by a lower voltage than discharge starting voltage because a charged particle is left in the discharged cell. Therefore, in a cell in which an address discharge occurs, the discharge is continued by a sustaining pulse 33 having a voltage of VS2 supplied next to a scanning pulse 32. Such a driving method is called a memory drive method.

Next, the method for displaying gradations of luminance will be described using a time sharing drive method utilizing the above memory drive method (or a sub-field system). The sub-field system is a method for realizing multiple gradations by dividing one field into plural sub-fields weighted according to the difference in the luminance or brightness and selecting an arbitrary sub-field every pixel according to the amplitude of a signal. The word "field" used in this specification means a vertical scanning period and sometimes is called a "frame", and a "sub-field" is called a "sub-frame".

FIG. 3 illustrates an example of a drive sequence of a prior plasma display apparatus of DC the type. A drive sequence 40 utilizing the time sharing drive method shown in FIG. 3 is an example in which an image is displayed in sixteen gradations by four sub-fields SF1 to SF4. A scanning period 41 indicates a period for selecting a light emitting cell in a first sub-field and a sustaining period 42 indicates a period in which the selected cell emits light. Each sustaining period of the sub-fields SF1 to SF4 is weighted so that the luminance ratio of the sub-fields is 8:4:2:1, and if the luminance of these sub-fields is optionally selected according to the level of an image signal, a display in sixteen gradations equivalent to the fourth power of two is enabled. If the number of gradations is to be increased, the number of sub-fields has only to be increased, and, for example, if the number of sub-fields is eight, and the luminance ratio during the sustaining period is to be selected 128:64:32:16:8:4:2:1, a display in two hundred and fifty-six gradations is enabled. The luminance level of each sub-field is controlled by the number of pulses supplied during the sustaining period. This type of plasma display apparatus and the driving method are disclosed, for example, in SID94DIGEST (page 723–726).

FIG. 4 is a block diagram illustrating the outline of an AC-type plasma display device. The plasma display device 20 is constituted by a display panel 21, a plurality of address electrodes 26, a plurality of scanning electrodes 27, a plurality of sustaining electrodes 28, an address pulse generator 22 for driving the address electrodes 26, a scanning and sustaining pulse generator 23 for driving the scanning electrodes 27, a sustaining pulse generator 25 for driving the sustaining electrodes 28, and a signal processing circuit 24 for controlling the generators 22, 23, 25. The display panel 21 is provided with two spaced glass plates, the address electrodes 26, the scanning electrodes 27, the sustaining electrodes 28, and a partition for partitioning the space between the glass plates. A pixel is constituted by a discharge cell which has space partitioned by the partition between the two glass plates. The AC-type plasma display is different from the DC-type display in that an electrode is covered with a dielectric. Rare gas such as He—Xe and Ne—Xe is enclosed in each discharge cell, and if a voltage is applied between the address electrode 26 and the scanning electrode 27, a discharge occurs and ultraviolet rays are generated. A color display can be produced by coating every discharge cell with a red, a green and a blue phosphor and by selecting it according to an image signal.

FIG. 5 illustrates the drive waveform of an AC-type plasma display. In FIG. 5, numeral 50 denotes the drive waveform of the AC-type plasma display. The electrodes 26 and 27 are driven in line sequence and an address pulse 51 having a voltage VA is supplied, depending on an image signal, to an address electrode 26 corresponding to a discharge cell in the Nth row. In the meantime, a scanning pulse 52 having a voltage VS is supplied in order from the first line to a scanning electrode 27. The address voltage VA and the scanning voltage VS are simultaneously supplied to a cell. When the voltage between the address electrode 26 and the scanning electrode 27 exceeds the discharge starting voltage, the cell is discharged. Assuming that this discharge is an address discharge, in a cell in which discharge occurs, a charge is stored on a dielectric covering an electrode (hereinafter called a wall charge), and in a fixed period after it, the discharge can be sustained by a lower voltage than the discharge starting voltage. In the example shown in FIG. 5, the scanning electrode 27 also functions as a sustaining electrode and a sustaining discharge is caused by alternately supplying a sustaining pulse 53 to the scanning electrode 27 and the sustaining electrode 28. At this time, the direction of the discharge by the scanning electrode 27 and the sustaining electrode 28 is alternately changed. Therefore, the plasma display is referred to an AC type display. Such a drive method is called a memory driving method as in the case of the DC type display, and the AC-type plasma display can be driven in a drive sequence 40 as shown in FIG. 3 similar to the DC-type display. However, since the duration of the memory effect caused by a wall charge is longer, compared with that of the memory effect caused by a DC-type charged particle, another drive sequence is also proposed.

A drive sequence 60 by a time sharing drive method shown in FIG. 6 is an example of a case in which an image is displayed in sixteen gradations by four sub-fields SF1 to SF4. A scanning period 61 is a period for selecting a light emitting cell in a first sub-field SF1, and a sustaining period 62 is a period in which the selected cell emits light. Each sustaining period of the sub-fields SF1 to SF4 is weighted so as to have a luminous ratio of 8:4:2:1, and if the luminance of these sub-fields is arbitrarily selected according to the level of an image signal, a display in sixteen gradations equivalent to the fourth power of two is enabled.

As described above, the principle of the time sharing drive method is the same as that of the above DC type shown in FIG. 2, however, the time sharing drive method of the AC type is characterized in that the scanning period 61 and the sustaining period 62 are completely separated and the sustaining pulse 53 common to the whole screen is supplied to the sustaining period 62. This type of apparatus is disclosed on pages 7 to 11 in SHINGAKUGIHOU (Communications Institute Technical Report), EID 92-86 issued in January, 1993, for example.

In case a dynamic image taken by a camera is displayed by using the time sharing drive method, it has been reported that a disturbance, which is referred to as dynamic false contours or quantum noise, is brought about by the time sharing drive sequence. The disturbance or the noise is caused by a change in the light emitting interval which is varied by the display gradations and by the shift of one's eye followed by the dynamic image. To solve this problem, a high-ranking bit, which has large luminous weight, is divided into two and is emitted in different periods. When the high ranking 4 bit in the sub-fields having a luminous ratio of 8:4:2:1 is assigned to a digital image signal, for example, the highest ranking bit is divided into two and the number of the sub-fields is increased from 4 to 5. Then, the luminous ratio of the sub-fields becomes 4:4:2:1:4, and for the highest ranking bit, the first sub-field and the last sub-field are assigned. This is one of the ways to decrease or to suppress the dynamic false contours. Various proposals for a method for dividing the sub-field and the order for emitting the divided sub-field have been made. This kind of method has been described in, for example, SDI DIGEST 96 (page 291–294).

Presently, there is a demand for a display device which is provided with a high resolution and multiple gradations to correspond to any media. Particularly, by the wide-spread use of the photo CD and MPEG software, a display apparatus for displaying a high resolution image taken by a camera is required. In a case where a display apparatus with a high resolution is used, plural windows are provided on the screen and a dynamic image is displayed on one of the windows. In the field of television receivers, a so-called wide television having an aspect ratio of 16:9 is the subject of increasing interest in the market. Therefore, a dynamic image having an aspect ratio of 16:9 is required for display on a display device having aspect ratio of 3:4.

In the above sub-field system according to the prior art, it is difficult to increase the number of the sub-fields because a longer period is needed to increase the number of the scanning lines. On the other hand, it is necessary to increase the number of the sub-fields in order to increase the number of gradations, or to reduce the dynamic false contours by dividing the higher ranking bit. Therefore, providing both an improvement in the resolution and an improvement of the picture quality is very difficult. In case a dynamic image is displayed on a window on the display panel equivalent to XGA (1024768 dot), and for a window which corresponds to the VGA system, the number of scanning lines of an XGA display are 1.6 times that of a VGA display. The time required for scanning the sub-fields of the XGA display is also 1.6 times that of the VGA display. Therefore, the sustaining period is shortened and sufficient brightness is not obtained, or the number of sub-fields is reduced and sufficient gradations are not obtained. In this case, the image on the XGA display is deteriorated and becomes an unnatural image in comparison with the image of the VGA display.

SUMMARY OF THE INVENTION

An object of the present invention is to provide display apparatus having sufficient gradations or sufficient brightness.

Another object of the present invention is to provide a display apparatus and a display method for increasing the number of sub-fields.

A further object of the present invention is to provide a display apparatus and display method for increasing the sustaining period.

According to the present invention, a display apparatus and display method are provided for a display panel having pixels arranged in a matrix form for displaying an image on a effective display area. Horizontal electrodes and vertical electrodes are scanned for selectively illuminating said pixels by using a time sharing drive method in which one field period is divided into plural sub-fields weighted according to a sustaining period, wherein an effective display area is divided into plural areas, no scanning for selecting a light emitting pixel is executed in a non-display area, and the number of the above sub-fields is increased in an area in which display in multiple gradations is required in a display area to obtain sufficient gradation. Instead of increasing the number of the sub-fields, the total sustaining period per one field is increased to obtain sufficient brightness.

According to a feature of the invention, another area is provided in which the number of sub-fields is limited to the required minimum in which display in multiple gradations is not required.

According to other features of the invention, another area having few sub-fields is prepared instead of providing the non-display area.

DESCRIPTION OF THE PREFERRED EMBODIMENTS

Figure 1:
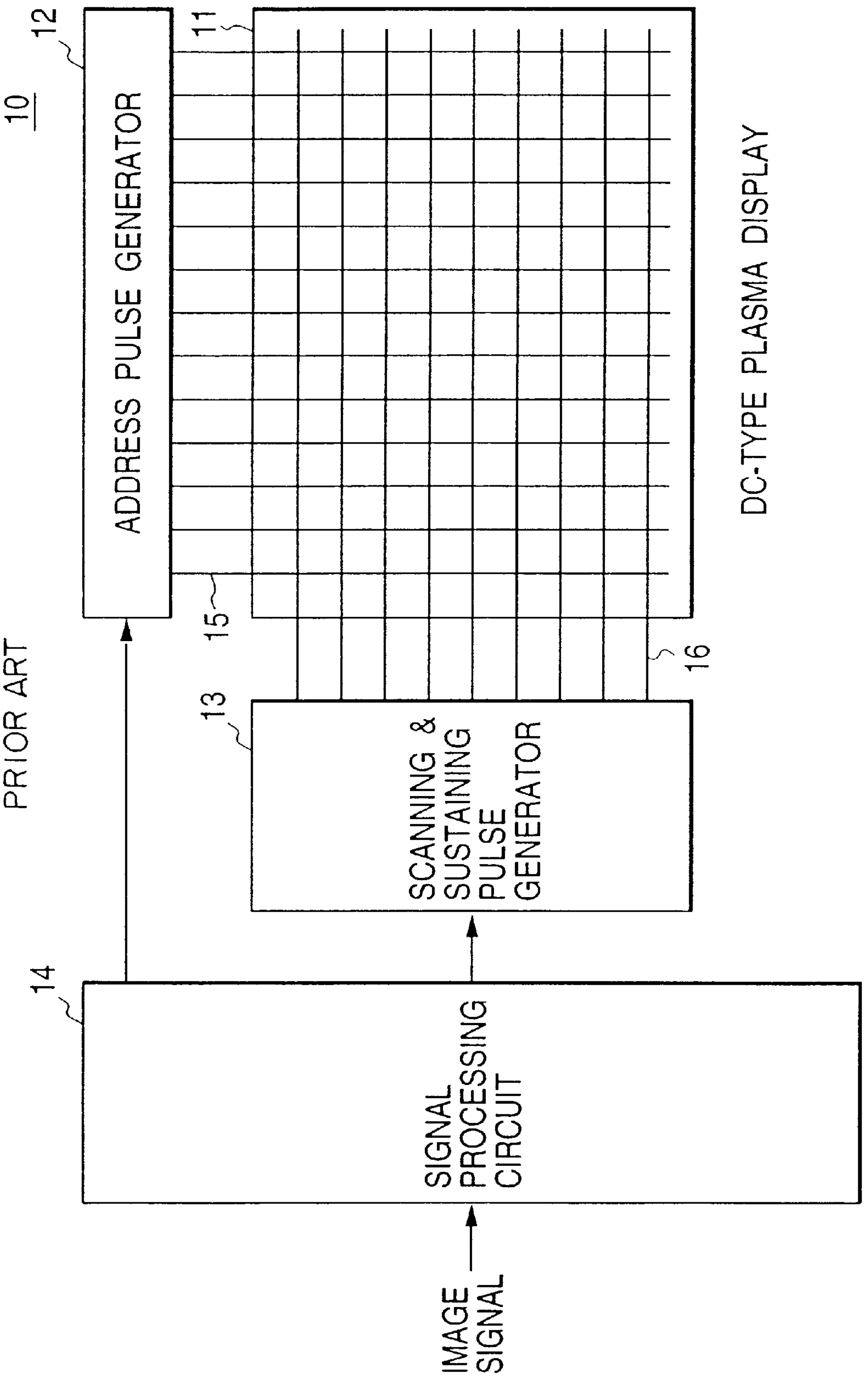
FIG. 1 PRIOR ART
FIG. 1 is a block diagram illustrating the outline of a conventional DC-type plasma display device.
Figure 2:
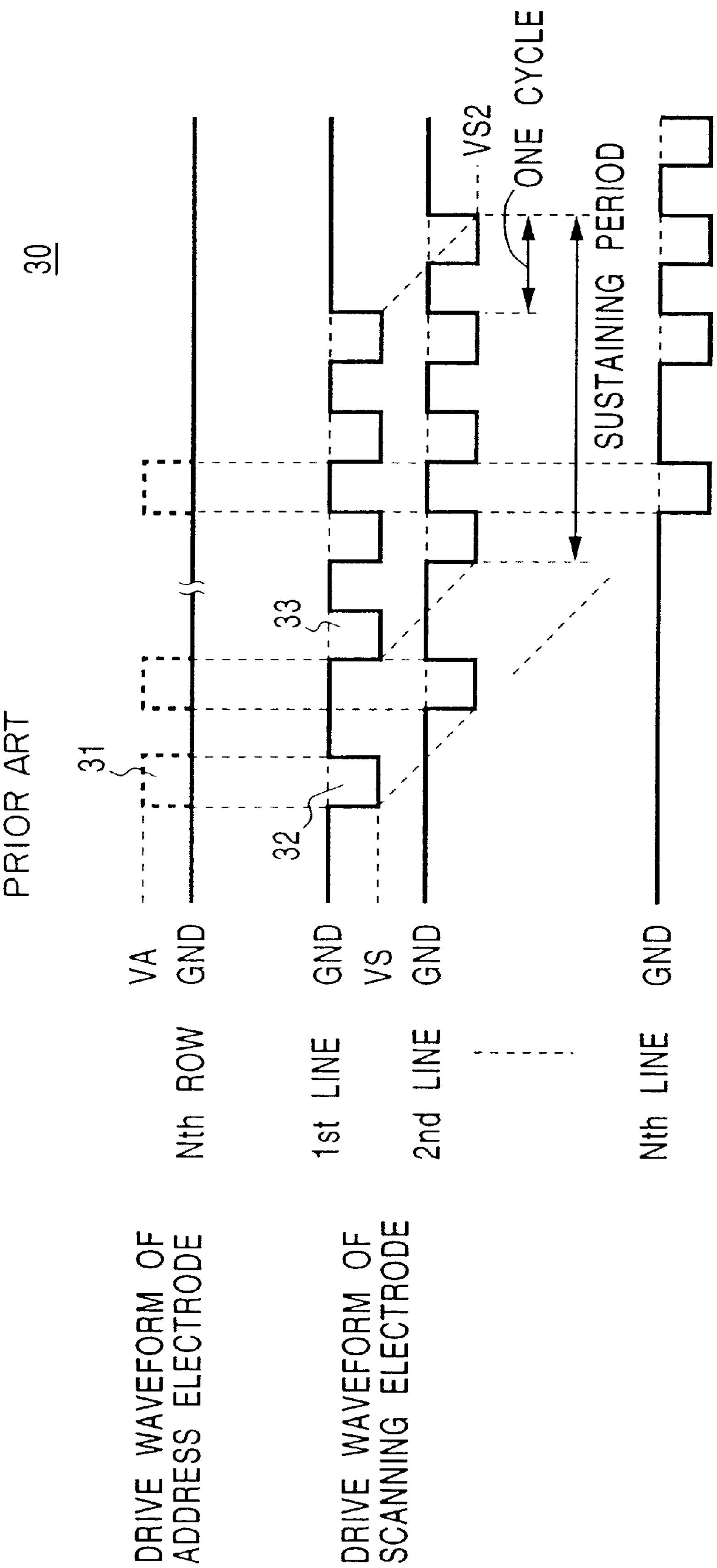
FIG. 2 PRIOR ART
FIG. 2 illustrates an example of the drive waveform of the conventional DC-type plasma display device of FIG. 1.

A plasma display device which represents an example of a matrix type display device according to the present invention is constituted by the display panels 11 and 21, the address electrodes 15 and 26, the scanning electrodes 16 and 27, the address pulse generators 12 and 22, the scanning and sustaining pulse generators 13 and 23 and signal processing circuits 14 and 24 for controlling the above generators 12, 22, 13 and 23, as shown in FIGS. 1 and 2. The display panel is provided with two spaced glass plates, the address electrodes 15 and 26, the scanning electrodes 16 and 27, and a partition for partitioning the space between the glass plates. A pixel has a discharge cell which occupies a space partitioned by the partition between the two glass plates. Rare gas such as He—Xe and Ne—Xe is enclosed in each discharge cell, and when a voltage is supplied to the address electrodes 15 and 26 and the scanning electrodes 16 and 27, ultraviolet rays are generated by the gas discharge in the corresponding discharge cell, and the phosphor on the partition is excited and emits light. A color display can be produced by coating every discharge cell with a red, a green and a blue phosphor and selecting it according to an image signal.

Figure 6:
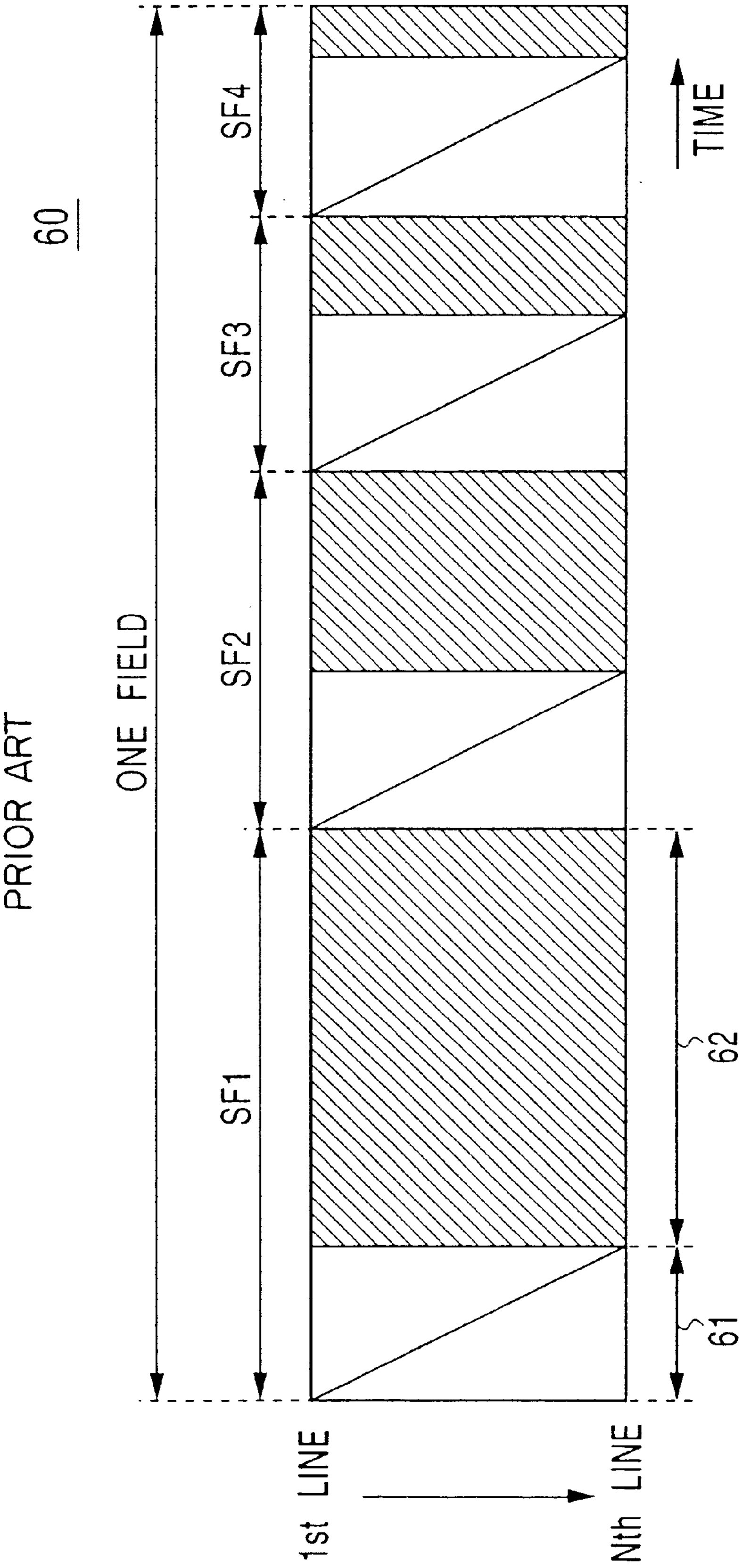
FIG. 6 PRIOR ART
FIG. 6 illustrates an example of the drive sequence of the conventional AC-type plasma display device of FIG. 4.
Figure 7A:
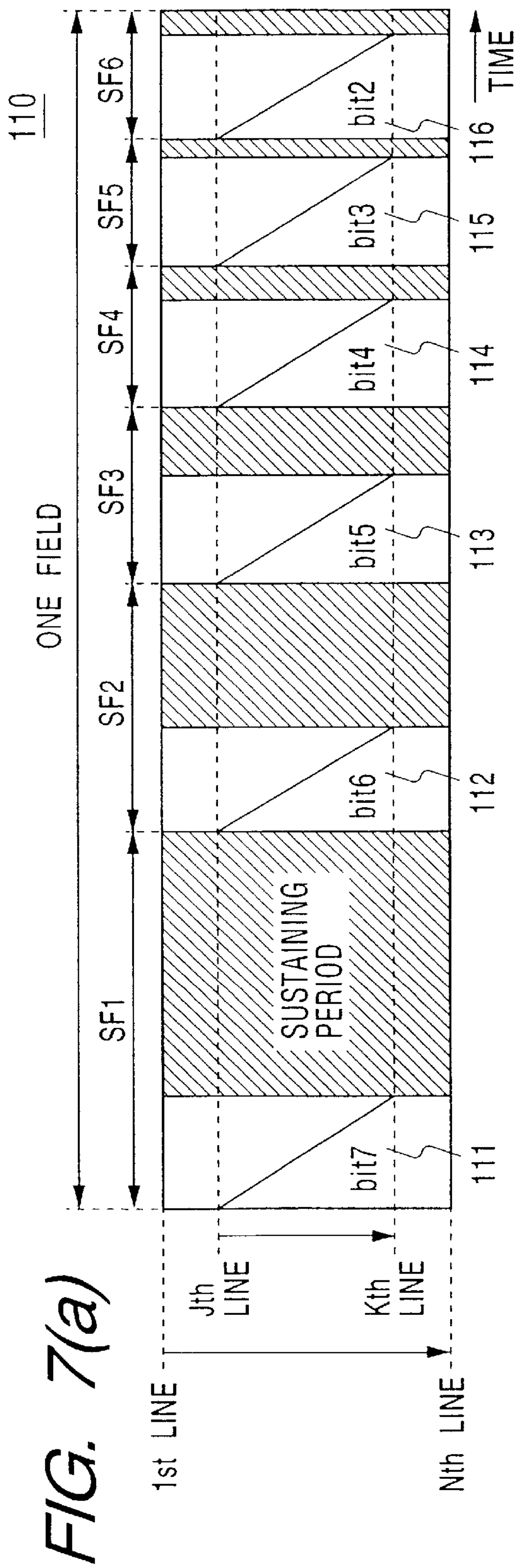
FIGS. 7(*a*)–(*d*) illustrate drive sequences of the present invention.
Figure 7B:
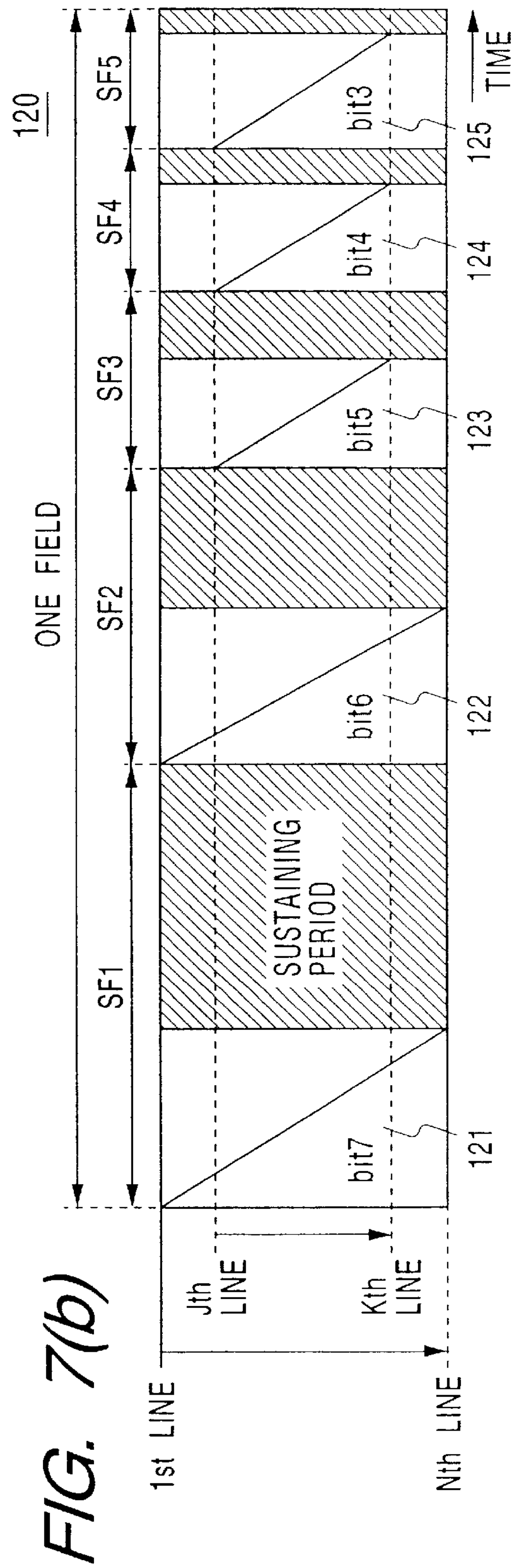
Figure 7C:
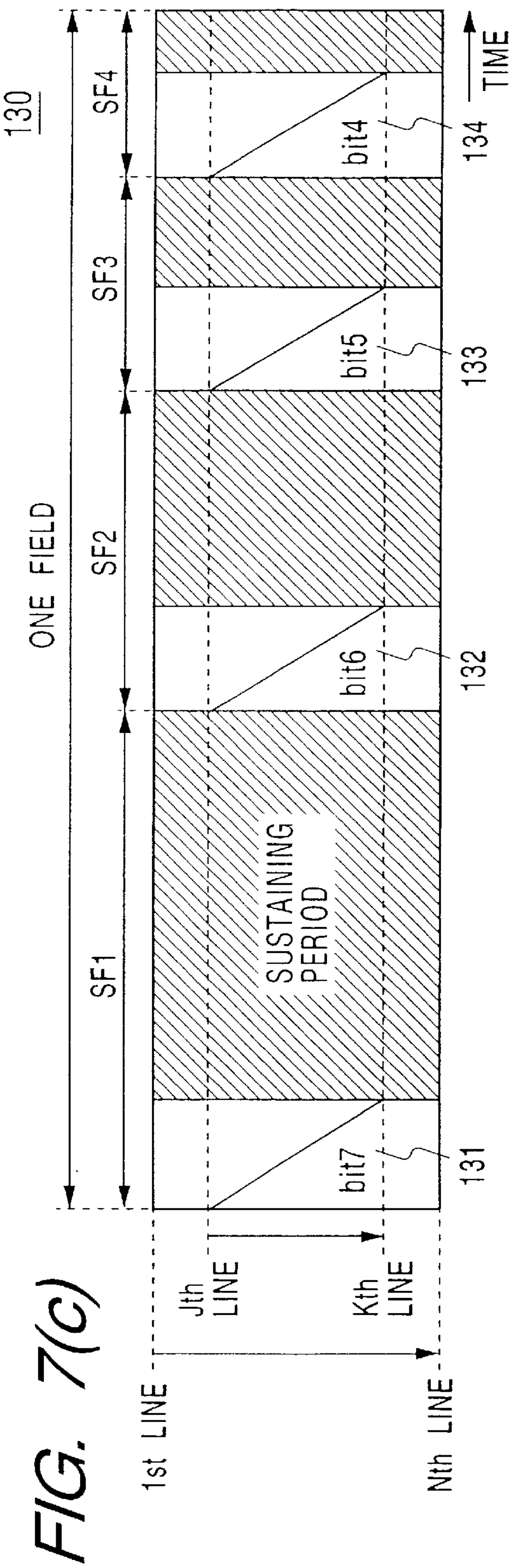
Figure 7D:
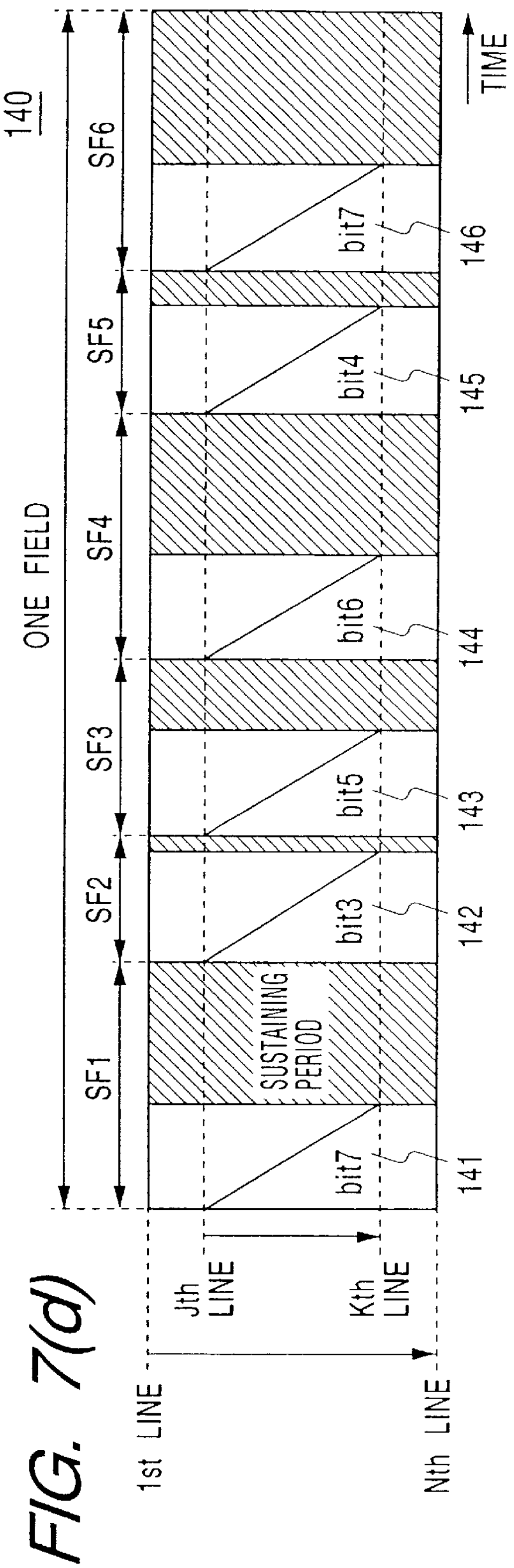

FIGS. 7(*a*) to 7(*d*) illustrate the embodiments of the present invention in which a drive sequence the same as the sequence 60 shown in FIG. 6 is applied. Generally, when the drive sequence shown in FIG. 6 is applied, the relationship between the scanning period and the sustaining period is expressed in the following equation:

$$Tsus \approx Tv - Tscn \times (L1 + L2 + \ldots Li \ldots + Lm) \quad (1)$$

Wherein:

Tsus: total sustaining period per one field

Tscn: a scanning period per one line

Li: number of scanning line corresponding to No. i sub-field m: total number of sub-fields per one field Tv: time of one field In the actual driving of the display apparatus, a vertical blanking period and a reset period for stabilizing the discharge etc. are required, but these periods are so small for one field that they are omitted in the equation (1).

The embodiment of the present invention will be explained, assuming that a drive sequences of the embodiments and the drive sequence 60 are applied to the same display apparatus.

Figure 8A:
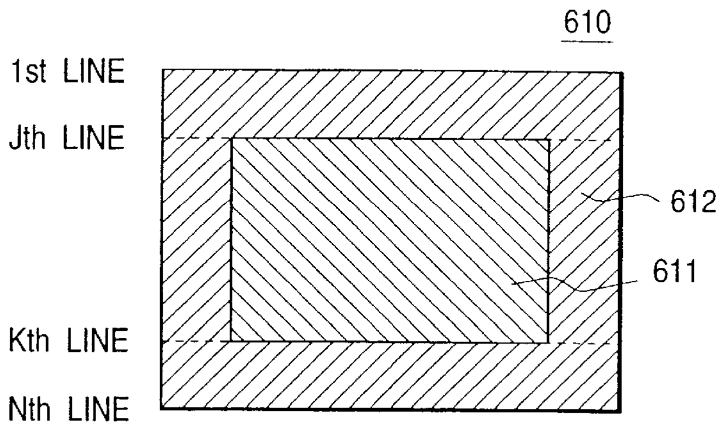
FIGS. 8(*a*)–(*c*) illustrate an example of the display screen of a display device in a case where the present invention is applied.
Figure 8B:
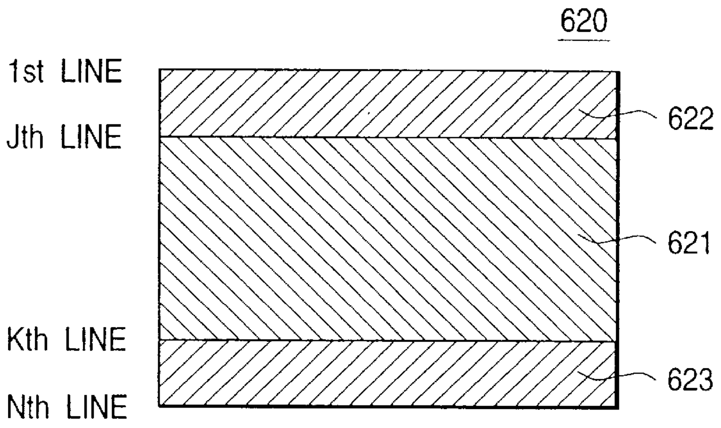
Figure 8C:
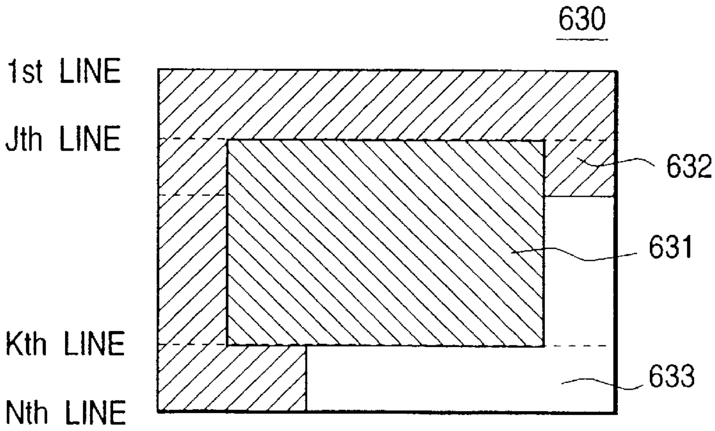

FIGS. 7(*a*) to 7(*d*) illustrate drive sequences of the present invention. FIG. 7(*a*) illustrates a drive sequence in which only the center part is scanned. Numeral 110 designates this drive sequence. FIG. 8(*a*) shows the state of the screen display 610 illustrating a display area and the non-display areas. The numeral 611 designates an effective display area in which an image can be displayed. The numeral 612 designates a non-display area in which no image is displayed. FIG. 8(*b*) shows the state of the screen display 620 illustrating a display area and a non-display area. The numeral 621 denotes an effective display area in which an image can be displayed, which numerals 622 and 623 denote non-display areas in the upper side and in the lower side respectively. Comparing the scanning period shown in FIG. 6 with that of FIG. 7(*a*), the scanning period 111 of the drive sequence 110 is shorter than the scanning period 61 of the drive sequence 60. This is because scanning electrodes corresponding to the first line to the Jth line and the Kth line to Nth line in the above non-display areas 612,622 and 623 are not scanned. At the time, the voltage of the electrodes which are not scanned is held at an arbitrary fixed voltage.

Supposing that the sustaining periods of the drive sequence 60 and 110 are for a time corresponding to 25 percent of one field, the number of the scanning lines N is 756 lines, which corresponds to the scanning lines of an XGA system, and the number of the scanning lines between the Jth line and Kth line is 480 lines, which corresponds to the scanning lines of the VGA system. From the equation (1), when the number of the sub-fields in the drive sequence 110 is six, the scanning periods between drive sequences 110 and 60 per one field become nearest, so that the number of the sub-fields is increased from 4 to 6. If the luminous weights from the first sub-field to the sixth sub-field are 32:16:8:4:2:1, and a digitized image data is assigned in order from the highest ranking bit, the number of gradations can be increased to 64 in the drive sequence 110 from 16 in the drive sequence 60.

Figure 4:
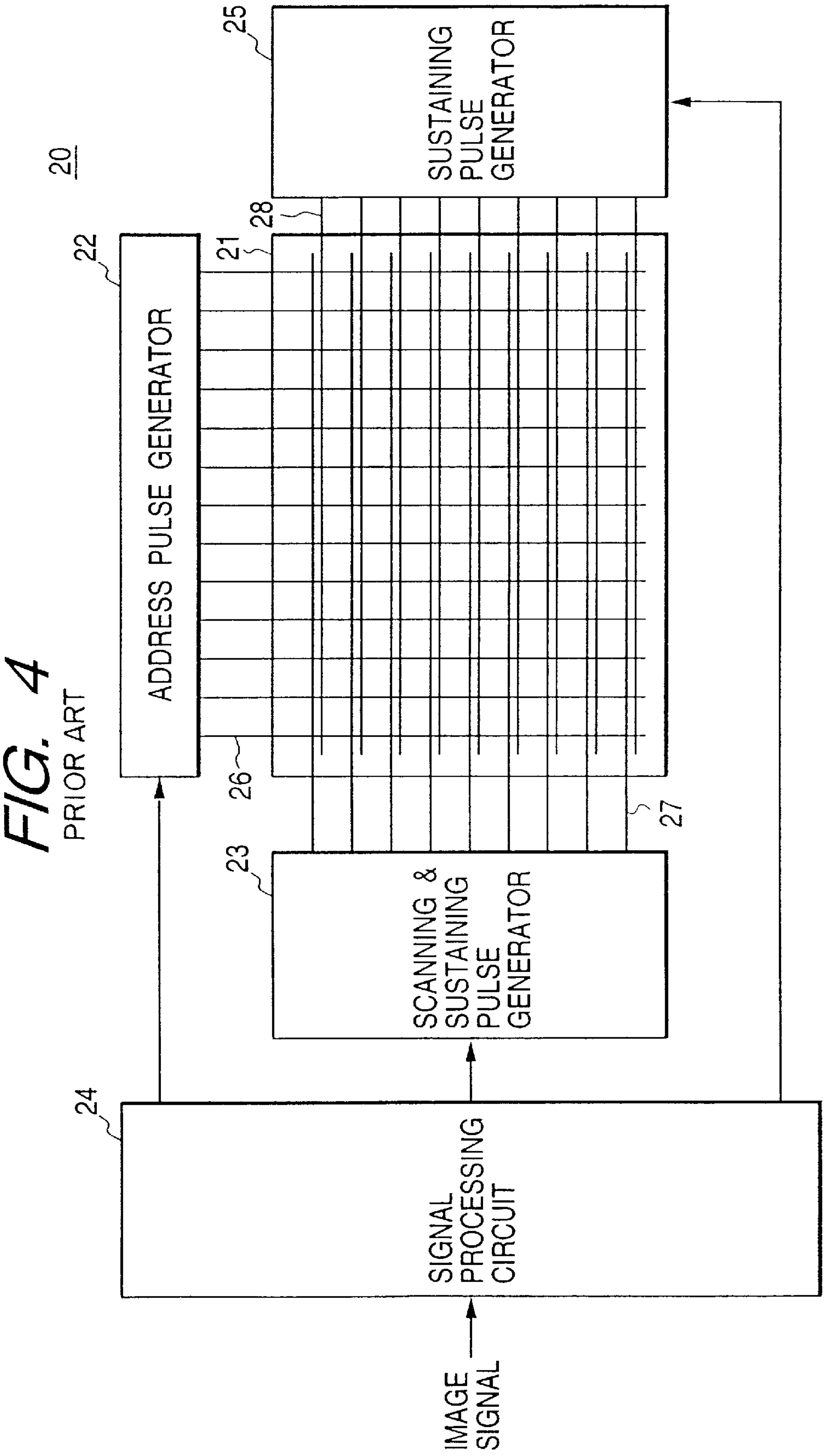
FIG. 4 PRIOR ART
FIG. 4 is a block diagram illustrating the outline of a conventional AC-type plasma display device.
Figure 5:
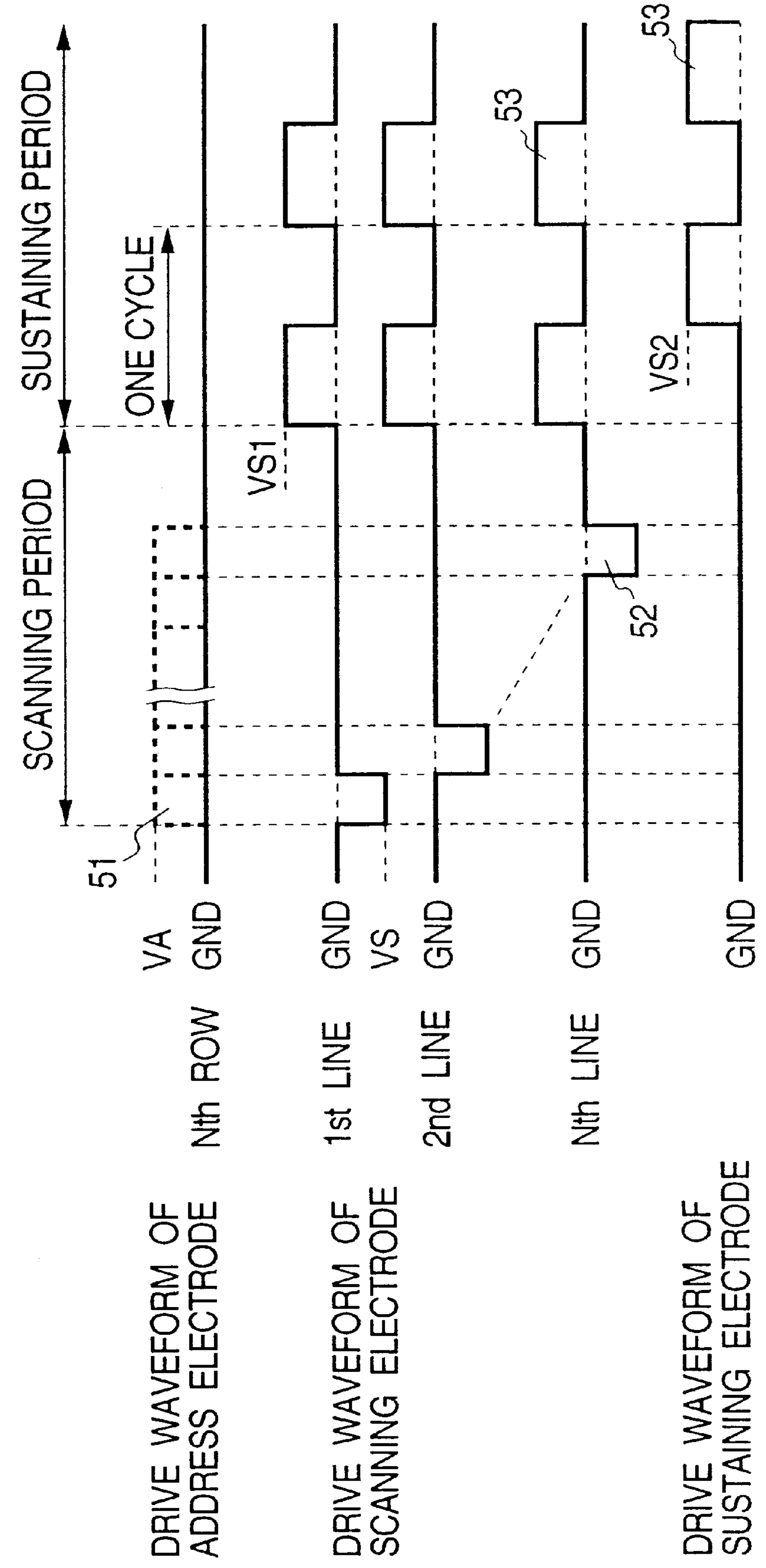
FIG. 5 PRIOR ART
FIG. 5 illustrates an example of the drive waveform of the conventional AC-type plasma display device of FIG. 4.
Figure 9:
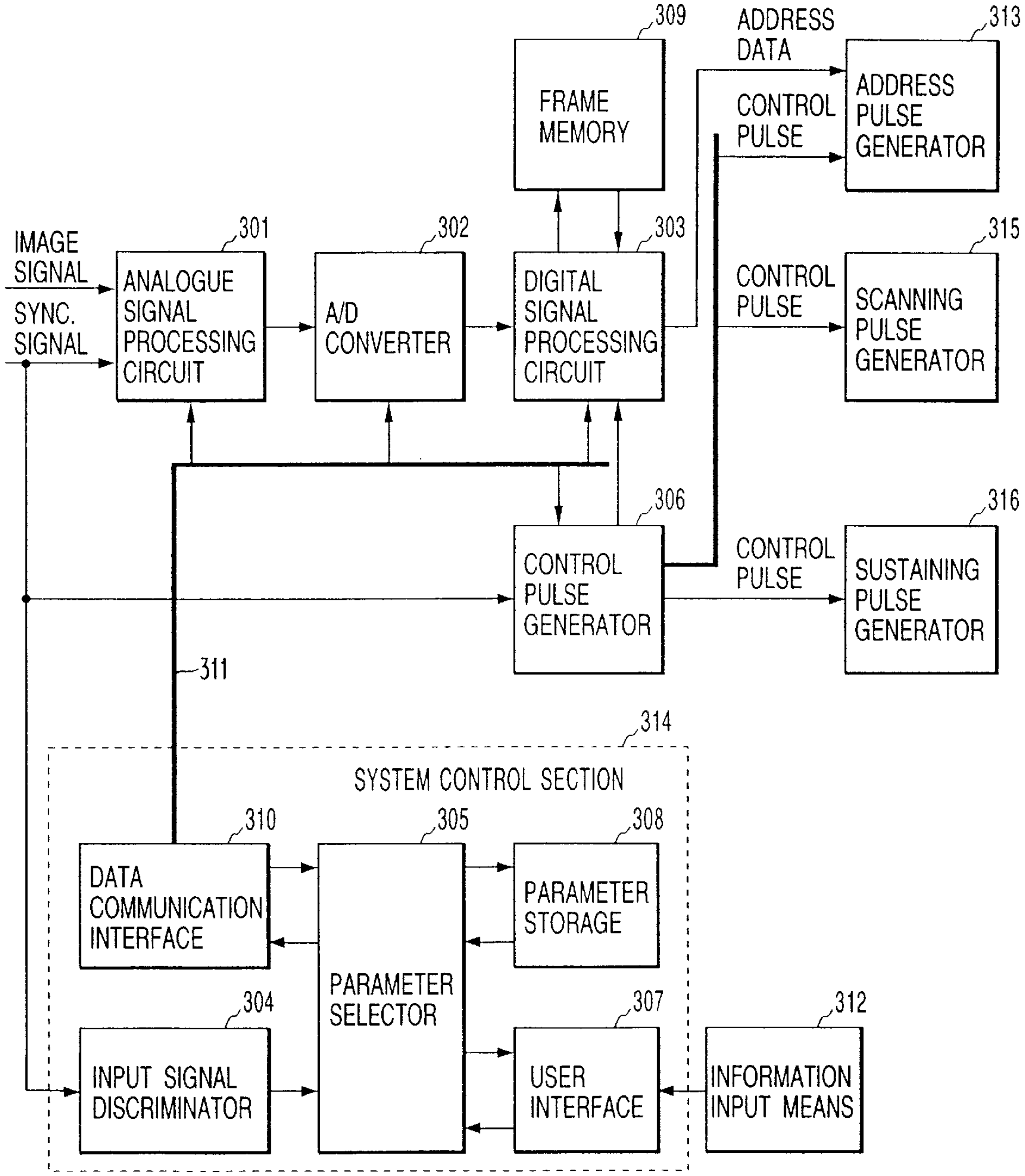
FIG. 9 is a block diagram illustrating a signal processor according to the present invention.

FIG. 9 is a block diagram that represents the basic structure of a signal processing circuit to realize the drive sequence according to the present invention, and this circuit is equivalent to the signal processing circuit 14 and the generators 12 and 13 shown in FIG. 1, as well as the signal processing circuit 24 and the generators 22, 23 and 24 shown in FIG. 4. An input image signal is written in a frame memory 309 through a digital signal processing circuit 303, after converting the image signal into digital data through an analogue signal processing circuit 301 and an A/D converter 302. In a control pulse generator 306, various control signals that are necessary for every sub-field are generated. The control signal from the control pulse generator 306 is supplied to the digital signal processor 303, and address data is read from the frame memory 309 and is supplied to an address pulse generator 313. In a system control section 314, there are provided an input signal discriminator 304, a parameter selector 305, a user interface 307, a parameter storage 308 and a data communication interface 310. In the input signal discriminator 304, the frequency of a synchronizing signal is counted and a signal format is discriminated. Information for the signal format is supplied to the parameter selector 305. According to the signal format information, the parameter selector 305 selects a parameter related to a display area which is stored in the parameter storage 308 and the parameter is transmitted to the control pulse generator 306 through a data communication bus 311. The control pulse generator 306 controls an address pulse generator 313, a scanning pulse generator 315 and a sustaining pulse generator 316 according to the parameter. Although the parameter related to the display area is selected from the parameter storage 308 as described above, another method for selecting the parameter can be used. For example, the parameter selector 305 can be composed of a microcomputer, a parameter related to a scanning area can be calculated from signal format information, outputted from input signal discriminator 304, and supplied to the control pulse generator 306 through the data communication interface 310 and the data communication bus 311 for controlling the parameter of the control pulse generator 306. Further, information from information input means 312 is supplied to the parameter selector 305 through the user interface 307 for setting the parameter related to the scanning area. As to the information input means 312, it may take the form of an input device, such as a remote controller, mouse or keyboard. Or a personal computer may be connected to the information input means 312 to transmit image information that is processed using a graphic board in the personal computer to the system control section 314 for setting the scanning area.

Figure 10:
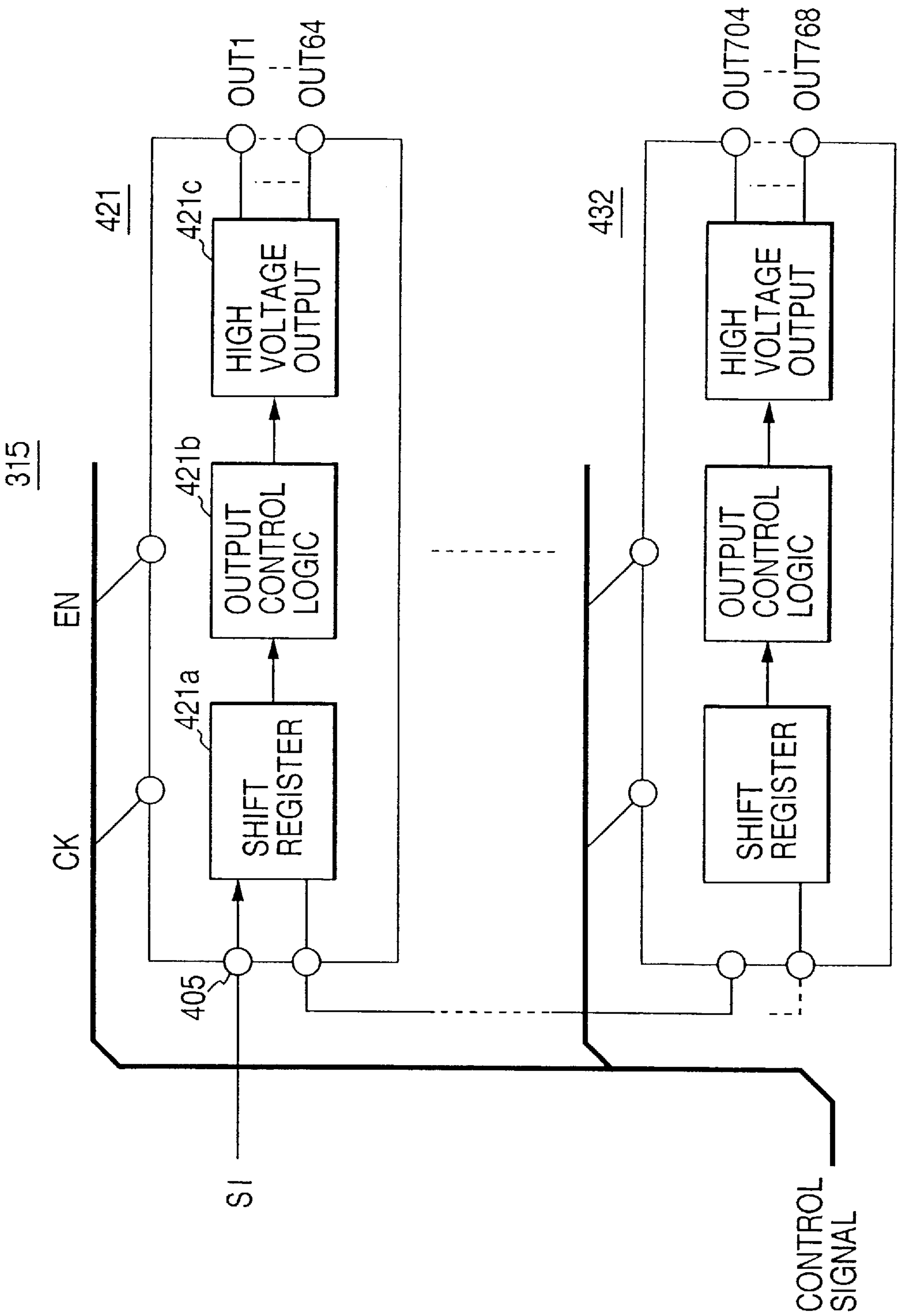
FIG. 10 is a block diagram illustrating a scanning pulse generator according to the present invention.

FIG. 10 is a block diagram illustrating the scanning pulse generator 315. The scanning pulse generator 315 is composed of several ICs 421, 432, etc. in which several output terminals of each IC are provided. Twelve ICs for the scanning pulse generator are used, if one of the ICs 421 and 432 has 64 output channels and the display has 768 scanning lines corresponding to the XGA system. The IC 421 for the scanning pulse generator is composed of a shift resistor 421*a*, an output control logic circuit 421*b*, and a high voltage output circuit 421*c*.

Following is an explanation of the scanning pulse generator IC 421. A data pulse SI from a data input terminal 405 is supplied to the shift-resistor 421*a* and is converted serial-parallel at the rising edge of a clock signal CK and is supplied to the output control logic 421*b*. The signal from shift-resistor 421*a* is controlled by the enable signal EN in the output logic circuit 421*b* and is supplied to the high voltage output circuit 421*c*, and is outputted from the output 1 to output 64.

Figure 11:
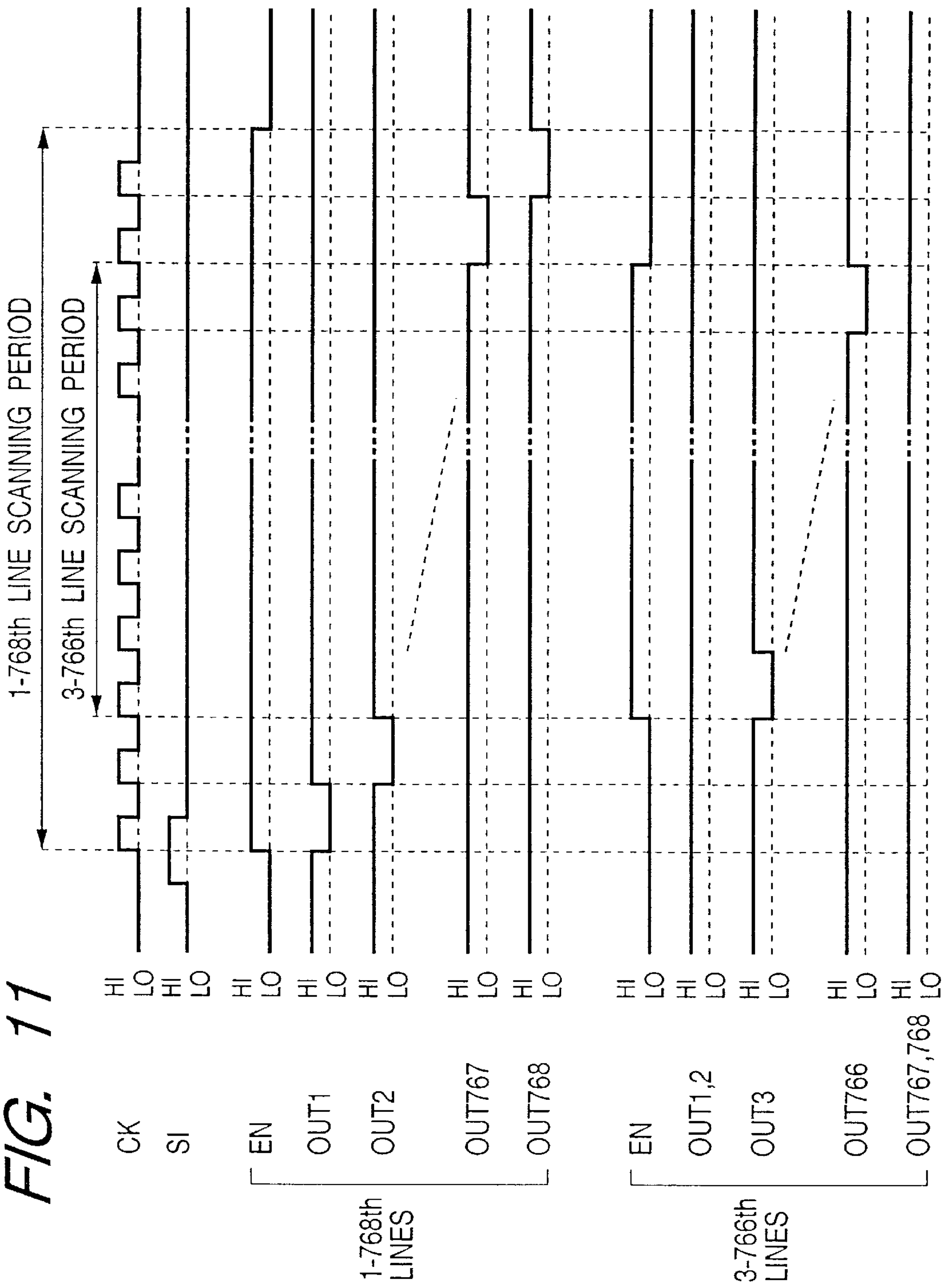
FIG. 11 is a drive waveform diagram illustrating a scanning pulse of the present invention.
Figure 12A:
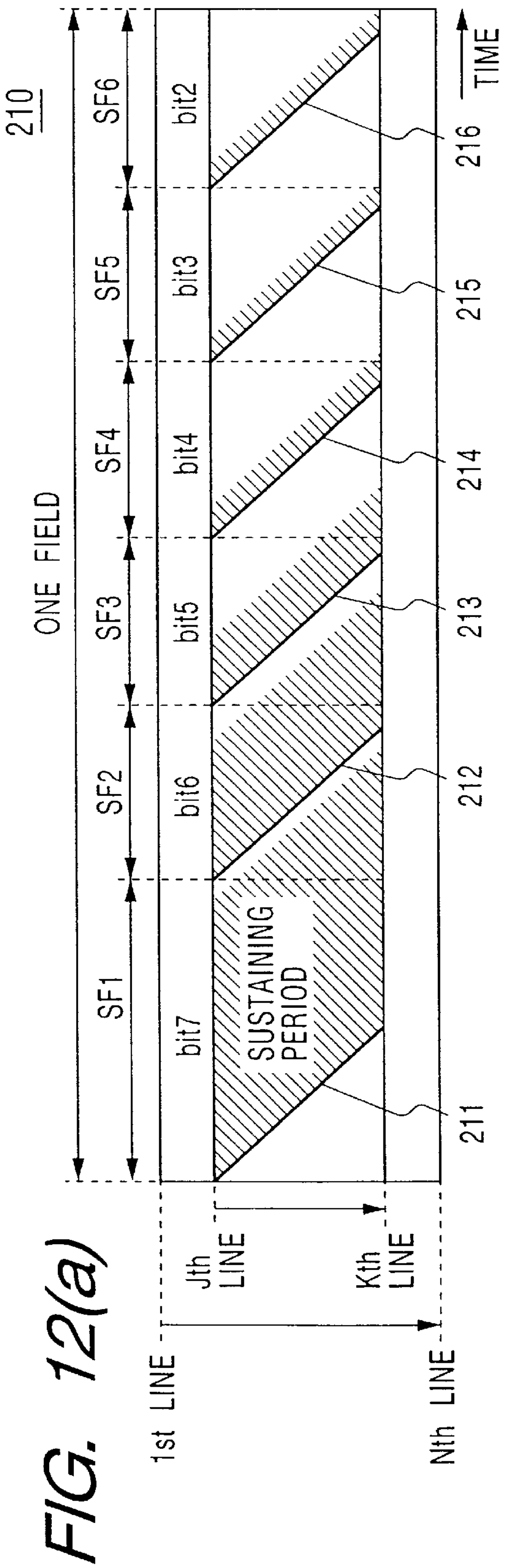
FIGS. 12(*a*)–(*d*) illustrate other drive sequences of the present invention.
Figure 12B:
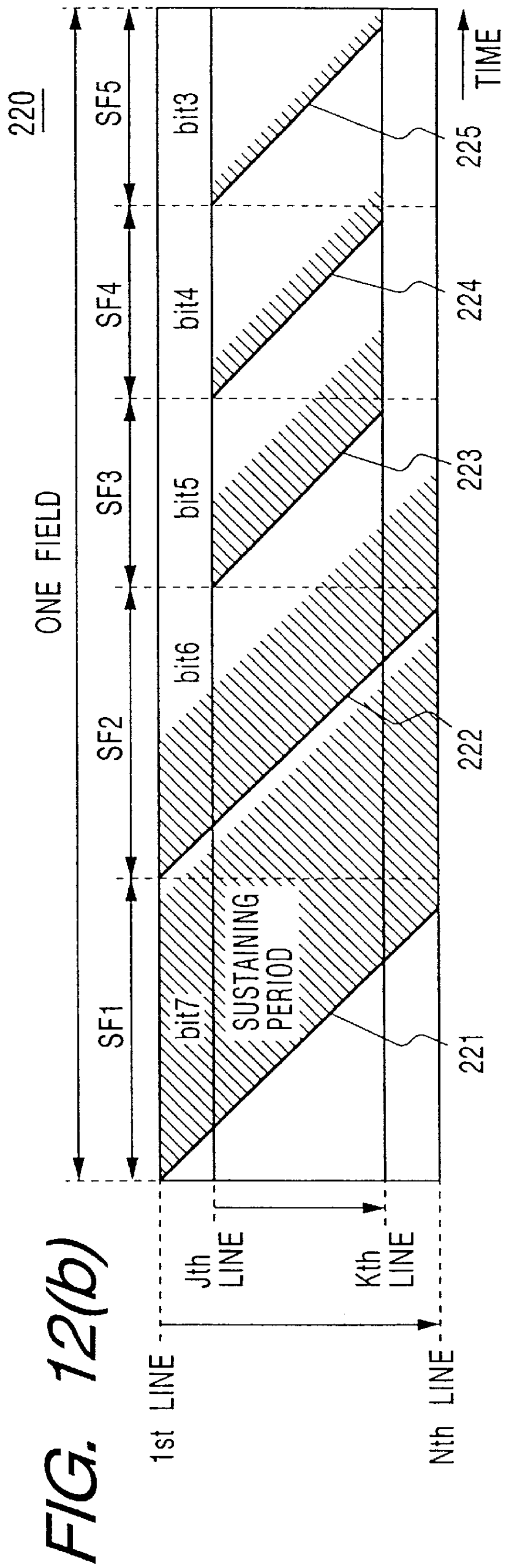
Figure 12C:
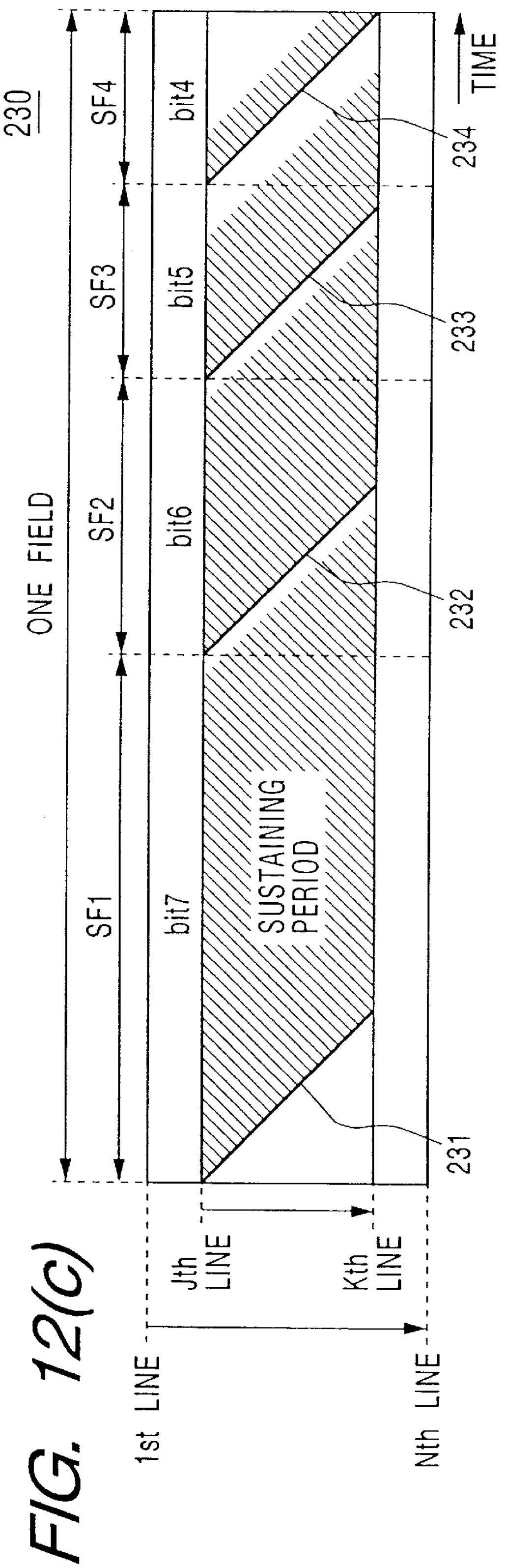
Figure 12D:
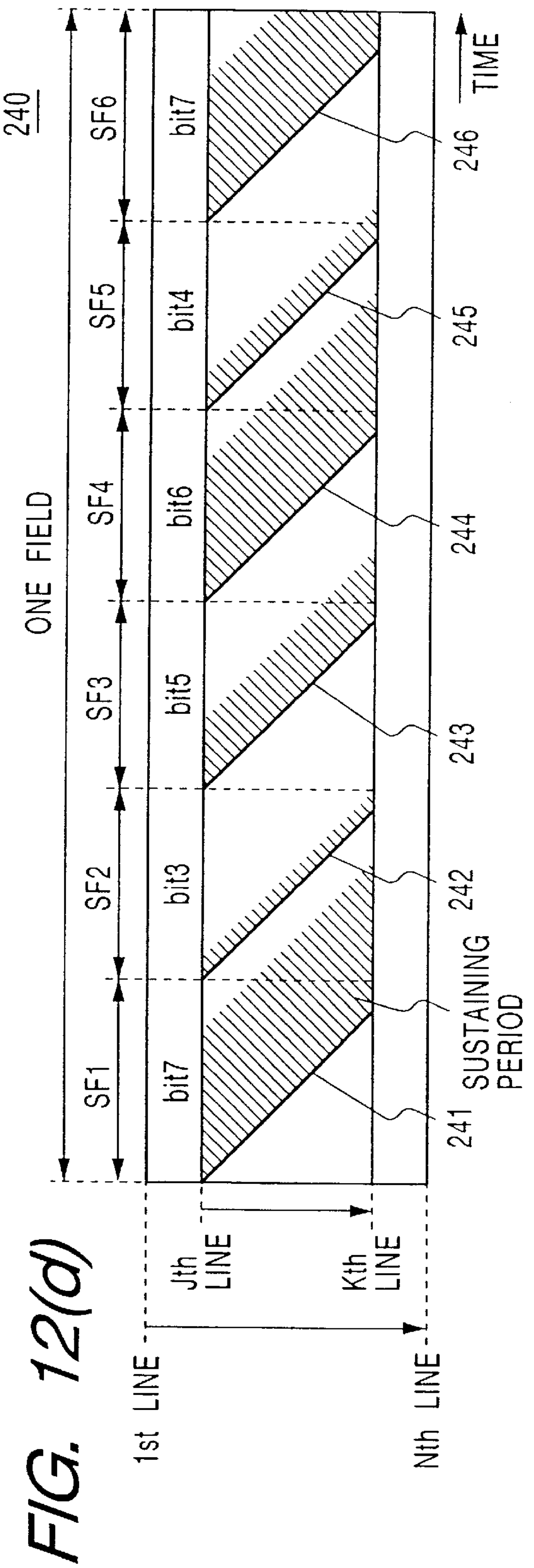

FIG. 11 illustrates scanning pulses which are generated by the scanning pulse generator shown in FIG. 10. In FIG. 11, the example that the first line to 768th line are scanned and the third line to 766th line are scanned is illustrated. The period for generating the scanning pulse is controlled by the enable signal EN in the output control logic circuit 421*b*. According to the embodiments, the period of the clock signal CK in the scanning pulse generating period and the scanning pulse non-generating period is the same. But any clock duration in the scanning pulse non-generating period may be used. The sustaining period can be overlapped with the scanning pulse non-generating period. The illustrated scanning pulse generator 315 and the control method of the scanning pulse are one of the embodiments, and any block diagram and scanning pulse control method may be applied for controlling the scanning pulse. The control pulse generator 306 changes a scanning pulse control signal by the display area setting parameter which is selected by the parameter selector 305 of the system control section 314, and the generation of the scanning pulse is controlled. One of the most important features in the embodiment is that means for discriminating the scanning area or means for setting the scanning area is provided, and the parameter for setting the scanning area is supplied to the control pulse generator 306 for controlling the scanning area. As a result, the display panel is driven by the method shown in sequence 110. The size of the effective display area and the number of display scanning lines may be selected according to the input image signal or user setting.

Another embodiment that shows an improvement of the picture quality by shortening the scanning period similar to the above embodiments will be explained below. FIG. 7(*b*) illustrates a drive sequence in which a relatively small number of display gradations are applied to some portions of an effective display area and a larger number of display gradations are applied to the center area of the display. Numeral 120 denotes the drive sequence shown in FIG. 7(*b*). The state of the display 610 in FIG. 8(*a*) is that the display area 612 is set to have relatively few display gradations and the display area 611 is set to have a lot of display gradations. Regarding the display 620 shown in FIG. 8(*b*), the display area 621 is set to have a lot of display gradations and the display areas 622 and 623 are set to have relatively few display gradations. In the scanning periods 121 and 122 of the sequence 120, the first line to the Nth line are scanned, and in the scanning periods 123,124 and 125, the Jth line to the Kth line are scanned. That is, the first line to the Jth line are not scanned in the third, fourth and fifth sub-fields.

Supposing that the sustaining period of the drive sequence 120 is 25 percent of one field period, the number of the scanning lines, N is 765 lines which corresponds to the scanning lines of the XGA system, and the number of the scanning lines between the Jth line and the Kth line is 480 lines, which corresponds to the scanning lines of the VGA system. The areas 622 and 623 are displayed by two sub-fields and have 4 gradations. From the equation (1), when the number of the sub-fields in the drive sequence 120 is five, the scanning periods between drive sequences 120 and 60 per one field become nearest. If the luminous weights of 16:8:4:2:1 are applied from first sub-field to the fifth sub-field, and a digitized image data is assigned in order from the highest ranking bit, the number of gradations are increased to 32 from 16 in the drive sequence 60. The area that has few display gradations is efficiently used for displaying, for example, an operation menu of the display, or the sub-title information of a film software, etc. To select both side areas of the display area 611 which are set to have few display gradations, the voltage between the address electrode 26 and the scanning electrode 27 that correspond to both side areas of the display 611 is determined during scanning periods 123, 124 and 125 such that a discharge does not occur.

FIG. 7(*c*) illustrates a drive sequence in which the time gained by shortening the scanning period is assigned to increase the sustaining period for improving the brightness. Numeral 130 denotes the drive sequence. FIG. 8(*a*) and FIG. 8(*b*) show the state of the display screen. In FIG. 8(*a*), a bright image is displayed in the display area 611 of the display 610, and no image is displayed in the area 612. In FIG. 8(*b*), a bright image is displayed in the area 621 of the display 620, and no image is displayed in the areas 622 and 623. Let us suppose that the number of sub-fields of the drive sequence is four, the number of the scanning lines N is 756 lines, which corresponds to the scanning lines of the XGA system, and the number of the scanning lines between the Jth line and Kth line is 480, which corresponds to the scanning lines of the VGA system. The relationship between the scanning period and the sustaining period is expressed by the equation (1). In case the sustaining period is 25 percent of the one field when all lines are scanned, the sustaining period is increased 53 percent by shortening the scanning period. Therefore, the brightness is about double.

FIG. 7(*d*) illustrates a drive sequence in which two sub-fields are increased by shortening the scanning period, and one of the sub-fields is used for increasing the display gradations, while the other sub-field is used for reducing the false contour or quantum noise. In this embodiment, the highest ranking bit which has the largest luminous weight is divided by two and is assigned to the first and sixth sub-fields, so that the illumination time is dispersed. Therefore, the display gradations are increased and the false contour or quantum noise is reduced. The embodiments shown in FIGS. 7(*a*)–(*d*) are put into practice by using the signal processing circuit shown in FIG. 9 and FIG. 10. By changing the parameter for setting the scanning area in the control pulse generator 306, many display areas may be selected. Various combinations of the embodiments shown in FIG. 7(*a*)–(*d*) may be used according to the usage of the display and a variety of signals inputted to the display. In case a display area is further subdivided, the above-mentioned embodiments are basically applied. FIG. 8(*c*) illustrates another embodiment of the display apparatus. A display 630 has three display areas 631 632 and 633. An image having few display gradations is displayed in the area 633, and an image having a lot of display gradations is displayed in the area 631, while no image is displayed in the area 632. In this case, the first area between the first line and the Jth line is not scanned, the second area between the Kth line and the Nth line is scanned a few times and the third area between the Jth line and the Kth line is scanned many times. Now, a discharge by a sustaining pulse does not occur in the area to which a scanning pulse is not supplied. Therefore, even if the sustaining pulse is supplied to the scanning electrode 27 and the sustaining electrode 28 which correspond to the non-display area, an image is not displayed. Even if a discharge is not generated, an electric power loss occurs because a pulse is supplied to a capacitive load and a charge and a discharge are repeated. To prevent the power loss, plural sustaining pulse generators, instead of one generator 314, are provided, and one sustaining pulse generator which corresponds to the non-display area is stopped.

FIGS. 12(*a*) to 12(*d*) illustrate other drive sequences in which the drive sequence 40 is applied to the display in FIGS. 8(*a*) to 8(*c*). The relationship of the sustaining period to the scanning period in the drive sequence 40 is expressed roughly by the following equation.

$$Tsus \approx Tv - Tscan \times (L1 + L2 + \ldots Li \ldots + Lm) + (Tv/m) \times 2 \ldots \quad (2)$$

Wherein,

Tsus: total sustaining period per one field

Tscn: a scanning period per one line

Li: number of scanning lines corresponding to No. i sub-field m: total number of sub-fields per one field Tv: time of one field In actual driving of the display apparatus, a vertical blanking period and a reset period for stabilizing the discharge etc. are required, but these periods are so small for one field that they are omitted in the equation (2).

Figure 3:
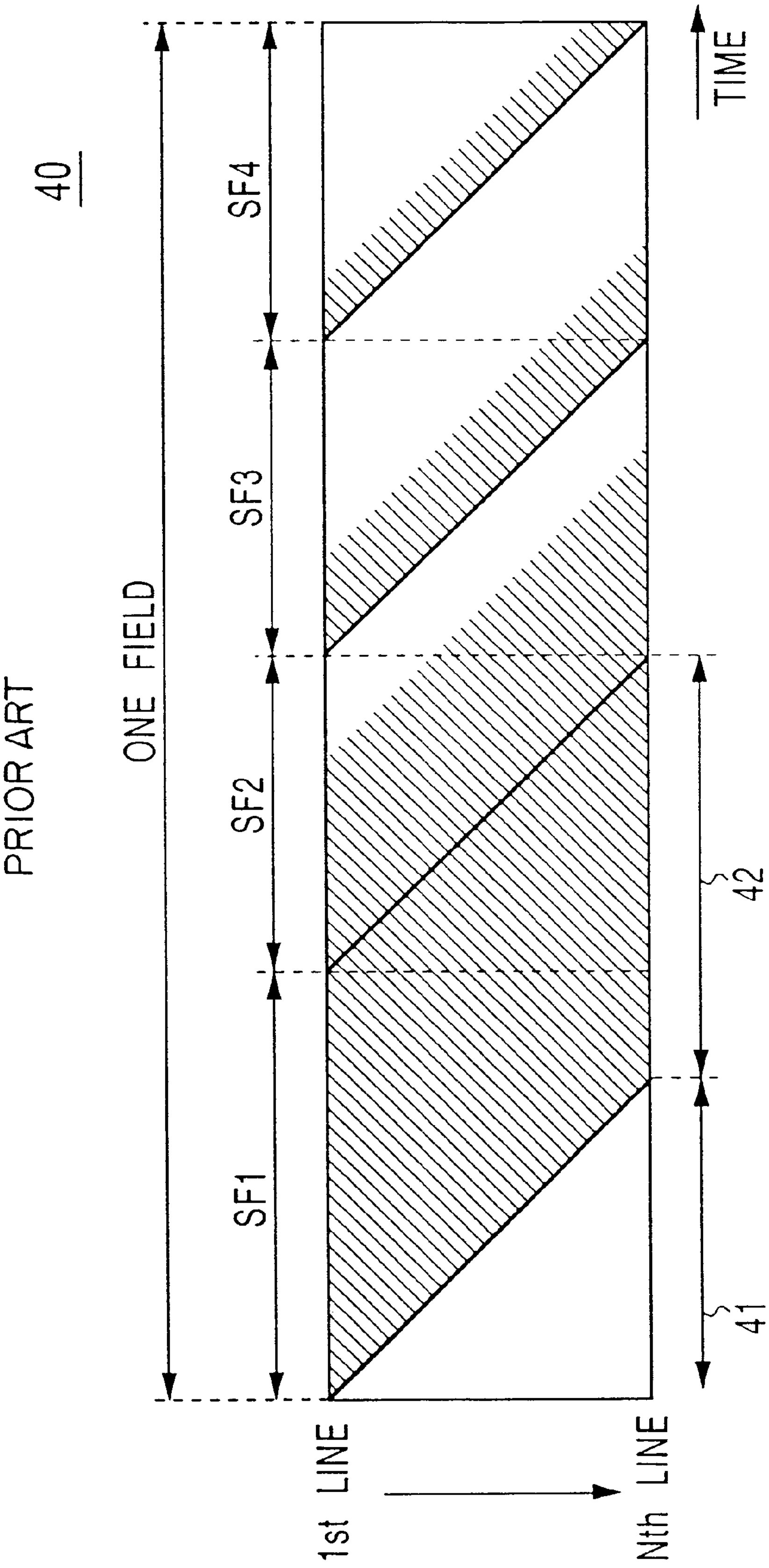
FIG. 3 PRIOR ART
FIG. 3 illustrates an example of the drive sequence of the conventional DC-type plasma display device of FIG. 1

The scanning period and the sustaining period are fully independent of each other in the driving method shown in FIG. 6, but as for the drive sequence shown in FIG. 3, a scanning period can be overlapped with a previous sustaining period. Therefore, the third member of the equation (2) is added to the equation (1). That is, if an inequality Tv>Tscan×(L1+L2+. . . Lm) is satisfied, at least a sustaining period corresponding to the third member is obtained. The third member of the equation (2) relates to the example where the luminous weight of each sub-field is the second power of 2 like 1:2:4:. . . and if the number of the sub-fields is 8 or less, a sustaining period of 25 percent per one field is acquired. Assuming that the drive sequence 40 and the sequences of the present embodiment are applied to the same display, the following explanation will be made. FIG. 12(*a*) illustrates a drive sequence in which the top and bottom area of the display are not scanned and only the center area is scanned. Numeral 210 denotes the drive sequence of FIG. 12. The state of the screen is such that an image is displayed only on the display area 611 of display 610 of FIG. 8(*a*) and no image is displayed on the display area 621, In FIG. 8(*b*), an image is displayed only on the display area 621 of the display 620 and no image is displayed on the other areas 622 and 623. only limited lines from the Jth line to the Kth line are scanned during a scanning period 211216 of the drive sequence shown in FIG. 12(*a*), the scanning period of the sequence 210 being shorter than that of sequence 60. This is because the lines from the first line to the Jth line and the lines from the Kth line to the Nth line are not scanned in the sequence 210. Supposing that the sustaining period of the drive sequences 40 and 210 is equal to 25 percent of one field period, the number of the scanning lines N is 756 lines, which corresponds to the scanning of the XGA system, and the number of the scanning lines between the Jth line and the Kth line is 480 lines, which corresponds to the scanning of the VGA system. From the equation (2), when the number of the sub-fields in the drive sequence 210 is six, the scanning periods between the drive sequences 210 and 40 per one field period become nearest, so that the number of the sub-fields is increased from 4 to 6. If the luminous weights from the first sub-field to the sixth sub-field are, for example, 32:16:8:4:2:1, and a digitized image data is assigned in order from the highest ranking bit, the number of display gradations is increased to 64 gradations from 16 gradations in the drive sequence 40.

FIG. 12(*b*) illustrates a drive sequence in which there are top and bottom areas having few display gradations, and a center area having many display gradations. Numeral 220 denotes this drive sequence. The state of the screen is such that a display area 611 having a lot of display gradations and a display area 612 having few display gradations are provided as seen in FIG. 8(*a*). Also, a display area 621 having a lot of display gradations and display areas 622 and 623 having few display gradations are provided as seen in FIG. 8(*b*). Lines from the first line to the Nth line are scanned during scanning periods 221 and 222 of the sequence 220, and lines from the Jth line to the Kth line are scanned during scanning periods 223, 224 and 225 of the sequence 220. This is because lines from the first line to the Nth line and lines from the Kth line to the Nth line are not scanned after the third sub-field. For the display shown in FIG. 8(*a*), the voltage between the address electrode 15 and the scanning electrode 16, which correspond to the areas on both sides of display area 611, are selected so as not to produce a discharge during the scanning periods 223, 224 and 225. Let us suppose that the sustaining period of the drive sequence 220 is 25 percent of one field period, the number of the scanning lines N is 756 lines, which corresponds to the scanning lines of the XGA system, the number of the scanning lines between the Jth line and the Kth line is 480 lines, which corresponds to the scanning lines of the VGA system, and the area having few display gradations is represented by two sub-fields, four gradations. From the equation (2), when the number of sub-fields in the drive sequence 220 is five, the scanning periods between drive sequences 220 and 40 per one field period become nearest, so that number of sub-fields is increased from 4 to 5. If the luminous weights are, in order from the first sub-field to the fifth sub-field, for example, 16:8:4:2:1, and digitized image data is assigned in order from the highest ranking bit, the number of display gradations is increased to 32 gradations from 16 gradations in the drive sequence 40. The area that has few display gradations can be efficiently used by displaying, for example, an operation menu or sub-title information of film software.

FIG. 12(*c*) illustrates a drive sequence in which the sustaining period is increased by shortening the scanning period for improving the brightness. The state of the screen is such that a bright image is displayed on the display area 611 of the display 610 and no image is displayed on the area 612, as seen in FIG. 8(*a*). Also, the state of the screen is such that a bright image is displayed on the display area 621 and no image is displayed on the display areas 622 and 623, as seen in FIG. 8(*b*). Numeral 230 denotes the drive sequence of FIG. 12(*c*). Let us suppose that the number of sub-fields is 4 in drive sequence 230, the number of the scanning lines N is 756 lines, which corresponds to the scanning lines of the XGA system, and the number of the scanning lines between the Jth line and the Kth line is 480 lines, which corresponds to the scanning lines of the VGA system. The relationship between the scanning period and the sustaining period is expressed by equation (1). When the number of the sub-fields is four, the maximum sustaining period is about fifty percent of the one field period. Eighty eight percent of one field period is assigned for the sustaining period, and a great deal of improvement in brightness will be achieved, if the shortening of the scanning period is shared with the sustaining period.

FIG. 12(*d*) illustrates a drive sequence in which two sub-fields are increased by shortening the scanning period, and one of the sub-fields is used for increasing the display gradations, while the other sub-field is used for reducing the false contour or quantum noise which occurs in case of displaying motion or a dynamic image. In this embodiment, the highest ranking bit which has the largest luminous weight is divided by two and is assigned to the first and the sixth sub-fields, so that the luminous time is dispersed. Therefore, the display gradations are increased and the false contour or quantum noise is reduced. The effect of the embodiments shown in FIGS. 12(*a*)–(*d*) is the same as that provided by the embodiments shown in FIGS. 7(*a*)–(*b*).

The embodiments shown in FIGS. 12(*a*)–(*d*) are put into practice by using the signal processing circuit shown in FIG. 9 and FIG. 10. By changing the parameter for setting the scanning area in the control pulse generator 306, various display areas may be obtained. Many combination of the embodiments shown in FIGS. 12(*a*)–(*d*) may be used according to the usage of the display and a variety of signals inputted to the display.

In the above embodiments, the number of sub-fields is set to four to facilitate the description, however, the number is not limited to four and may be set to an arbitrary number. An image in each sub-field may be displayed in an arbitrary order. The luminous weight of a sub-field may be changed. If the number of sub-fields is changed depending upon a display area, the number and order of sub-fields allocated to the respective areas also may be arbitrarily selected.

According to the present invention, when an image outputted from a TV and a photo compact disc is displayed on a high resolution screen, such as SVGA (800×600 dots), XGA (1024×768 dots) and SXGA (1280×1024 dots), if an image such as a dynamic image and a static image is taken in a window on the screen of a display device for controlling gradations by a time sharing driving method, sufficient luminance or sufficient gradations can be represented and a high resolution image can be provided.

What is claimed is:

1. A display apparatus comprising:

a display panel having pixels arranged in a matrix form by horizontal electrodes and vertical electrodes for displaying an image on an effective display area;

means for scanning electrodes for selectively illuminating the pixels;

means for forming a field with plural sub-fields; and means for forming a sub-field with a scanning period and an illuminating period;

each illuminating period having luminous weight and gradations being decided by a combination of selected sub-fields;

wherein a display area smaller than the effective display area is scanned so as to shorten the scanning period per a field for increasing illuminating period for increasing brightness.

2. A display apparatus according to claim 1, wherein the illuminating period has plural sustain pulses which make discharge and luminous increase by increasing the number of sustain pulses, and wherein the display is a plasma display system.

3. A display apparatus comprising:

a display panel having pixels arranged in a matrix form by horizontal electrodes and vertical electrodes for displaying an image on an effective display area;

means for scanning electrodes for selectively illuminating the pixels;

means for forming a field with plural sub-fields; and means for forming a sub-field with a scanning period and an illuminating period;

each illuminating period having luminous weight and gradations being decided by a combination of selected sub-fields;

wherein a display area smaller than the effective display area is scanned so as to shorten the scanning period per a field for providing another sub-field for raising display gradation.

4. A display apparatus comprising:

a display panel having pixels arranged in a matrix form by horizontal electrodes and vertical electrodes for displaying an image on an effective display area;

means for scanning electrodes for selectively illuminating the pixels;

means for forming a field with plural sub-fields;

means for forming a sub-field with a scanning period and an illuminating period;

each illuminating period having luminous weight and gradations is decided by a combination of selected sub-fields;

means for dividing the effective display area into plural areas; and means for changing the number of scanning times depending on the divided areas;

wherein at least other one of the divided areas is not scanned as a non-display area, to shorten the scanning period per a field for providing another sub-field to increase gradation of display area.

5. A display method for a display apparatus having a display panel for displaying an image on an effective display area that has pixels arranged in matrix form, means for scanning electrodes for selectively illuminating the pixels, means for forming a field with plural sub-fields, and means for forming a sub-field with a scanning period and an illuminating period, each illuminating period having luminous weight and gradations being decided by a combination of selected sub-fields, the display method comprising the steps of:

scanning a smaller area than the effective display area so as to shorten the scanning period; and increasing the number of sub-fields according to the shortened scanning period.

6. A display method for a display apparatus having a display panel for displaying an image on an effective display area that has pixels arranged in matrix form, means for scanning electrodes for selectively illuminating the pixels, means for forming a field with plural sub-fields, and means for forming a sub-field with a scanning period and an illuminating period, each illuminating period having luminous weight and gradations being decided by a combination of selected sub-fields, the display method comprising the steps of:

scanning a display area smaller than the effective display area so as to shorten the scanning period comparing with a scanning period of the effective area; and increasing an illuminating period per one field corresponding to the shortened period.

7. A display method according to claim 6, wherein the illuminating period has plural sustain pulses which make discharge and luminous increase by increasing the number of sustain pulses, and wherein the display is a plasma display system.

8. A display method for a display apparatus having a display panel for displaying an image on an effective display area that has pixels arranged in matrix form, means for scanning electrodes for selectively illuminating the pixels, means for forming a field with plural sub-fields, and means for forming a sub-field with a scanning period and an illuminating period, each illuminating period having luminous weight and gradations being decided by a combination of selected sub-fields, the display method comprising the steps of:

dividing the effective display area into plural areas; and changing the number of scanning times depending on the divided areas;

wherein at least other one of the divided areas is not scanned as a non-display area, to shorten the scanning period per a field for providing another sub-field to increase gradation of display area.

* * * * *